United States Patent
Cai et al.

(10) Patent No.: US 11,768,399 B2
(45) Date of Patent: Sep. 26, 2023

(54) DISPLAY PANEL, MANUFACTURING METHOD THEREOF, AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Xiujun Cai, Beijing (CN); Cuie Wang, Beijing (CN); Wenli Lan, Beijing (CN); Sa Li, Beijing (CN); Dong Wang, Beijing (CN); Dawei Wang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/490,783

(22) Filed: Sep. 30, 2021

(65) Prior Publication Data

US 2022/0186919 A1 Jun. 16, 2022

(30) Foreign Application Priority Data

Dec. 16, 2020 (CN) .......................... 202023032608.2

(51) Int. Cl.
*G02F 1/133* (2006.01)
*G02F 1/1333* (2006.01)
*G02F 1/13357* (2006.01)

(52) U.S. Cl.
CPC ........ *G02F 1/1336* (2013.01); *G02F 1/13318* (2013.01); *G02F 1/133331* (2021.01)

(58) Field of Classification Search
CPC .............. G02F 1/1336; G02F 1/13318; G02F 1/133331; G02F 2201/58; H04M 1/026; H04M 1/0266; H04M 2550/12; G09F 9/35; G09F 9/335; G02B 6/00
See application file for complete search history.

(56) References Cited

U.S. PATENT DOCUMENTS

| | | | |
|---|---|---|---|
| 2003/0121976 A1* | 7/2003 | Ostergard | H04N 1/00307 235/454 |
| 2014/0132578 A1* | 5/2014 | Zheng | G01J 1/4228 345/207 |
| 2017/0176787 A1* | 6/2017 | Jia | G02B 5/003 |
| 2021/0063795 A1* | 3/2021 | Ohira | G02F 1/133345 |
| 2021/0116735 A1* | 4/2021 | Huang | G02F 1/13338 |

FOREIGN PATENT DOCUMENTS

| | | |
|---|---|---|
| CN | 111258106 A | 6/2020 |
| CN | 211403405 U | 9/2020 |

* cited by examiner

*Primary Examiner* — Ryan A Lubit
(74) *Attorney, Agent, or Firm* — HOUTTEMAN LAW LLC

(57) ABSTRACT

The present disclosure provides a display panel, a manufacturing method thereof, and a display device. The display panel includes: a backlight module configured to provide a light source; a cover plate on a light-emitting side of the backlight module; a display module between the cover plate and the backlight module; and a photosensitive device configured to sense ambient light. The photosensitive device is between the cover plate and the backlight module, and at an edge of the cover plate.

17 Claims, 2 Drawing Sheets

DISPLAY PANEL, MANUFACTURING METHOD THEREOF, AND DISPLAY DEVICE

CROSS-REFERENCE TO RELATED APPLICATION

This application claims the benefit of priority to Chinese Patent Application No. 202023032608.2 filed on Dec. 16, 2020, the contents of which are incorporated herein in their entirety by reference.

TECHNICAL FIELD

The present disclosure belongs to the field of display technology, and specifically relates to a display panel, a manufacturing method thereof, and a display device.

BACKGROUND

With the continuous development of display technology, users' requirements on the structure and performance of a display device have also been continuously improved. For example, users have continuously increased requirements on the size of the bezel of the display device, making a display device with a full screen become an important development direction.

SUMMARY

In one aspect, the present disclosure provides a display panel including:
a backlight module configured to provide a light source;
a cover plate on a light-emitting side of the backlight module;
a display module between the cover plate and the backlight module; and
a photosensitive device configured to sense ambient light, wherein the photosensitive device is between the cover plate and the backlight module, and at an edge of the cover plate.

In the embodiments of the present disclosure, the display panel has a display area and an edge area surrounding the display area, and the photosensitive device is in the edge area.

In the embodiments of the present disclosure, the display module includes an array substrate, the array substrate extends from the display area to the edge area, the photosensitive device is on a side of the array substrate close to the cover plate, and an orthographic projection of the array substrate on the cover plate at least partially overlaps with an orthographic projection of the photosensitive device on the cover plate.

In the embodiments of the present disclosure, the orthographic projection of the photosensitive device on the cover plate is within the orthographic projection of the array substrate on the cover plate.

In the embodiments of the present disclosure, the display module further includes an optical film layer on a side of the array substrate close to the cover plate, and an orthographic projection of the optical film layer on the cover plate is within the orthographic projection of the array substrate on the cover plate.

In the embodiments of the present disclosure, the orthographic projection of the photosensitive device on the cover plate do not overlap with the orthographic projection of the optical film layer on the cover plate.

In the embodiments of the present disclosure, a first edge of the array substrate protrudes relative to the optical film layer; and the photosensitive device is at a side of the display panel where the first edge of the array substrate is located, and is directly on a portion of the array substrate protruding relative to the optical film layer.

In the embodiments of the present disclosure, the display panel further includes a first circuit board, the first circuit board is bent from a side of the backlight module close to the cover plate to a side of the backlight module away from the cover plate, such that a first end of the first circuit board is coupled to a second edge of the array substrate, and a second end of the first circuit board is coupled to a surface of the backlight module away from the cover plate, and the second edge of the array substrate is opposite to the first edge of the array substrate.

In the embodiments of the present disclosure, the display panel further includes a second circuit board, one end of the second circuit board is coupled to the light source of the backlight module, and the other end of the second circuit board is coupled to the second end of the first circuit board.

In the embodiments of the present disclosure, the second edge of the array substrate protrudes relative to the optical film layer, and the display panel further includes a supporting structure, which is on a side of the display panel where the second edge of the array substrate is located, and is directly on a portion of the array substrate protruding relative to the optical film layer.

In the embodiments of the present disclosure, wherein a portion of the cover plate within the edge area includes: a light-transmitting area and a non-light-transmitting area, and an orthographic projection of the photosensitive device on the cover plate is within the light-transmitting area.

In the embodiments of the present disclosure, the light-transmitting area is a transparent area.

In the embodiments of the present disclosure, the light-transmitting area of the cover plate is a through hole in the cover plate.

In the embodiments of the present disclosure, the photosensitive device includes a circuit board layer and a transparent photosensitive layer stacked on each other.

In the embodiments of the present disclosure, a material of the transparent photosensitive layer includes indium tin oxide.

In another aspect, the present disclosure provides a display device including a display panel, wherein the display panel includes:
a backlight module configured to provide a light source;
a cover plate on a light-emitting side of the backlight module;
a display module between the cover plate and the backlight module; and
a photosensitive device configured to sense ambient light, wherein the photosensitive device is between the cover plate and the backlight module, and at an edge of the cover plate.

In the embodiments of the present disclosure, the display panel has a display area and an edge area surrounding the display area, and the photosensitive device is in the edge area.

In the embodiments of the present disclosure, the display module includes: an array substrate, the array substrate extends from the display area to the edge area, the photosensitive device is on a side of the array substrate close to the cover plate, and an orthographic projection of the array substrate on the cover plate at least partially overlaps with an orthographic projection of the photosensitive device on the cover plate.

In the embodiments of the present disclosure, the display module further includes an optical film layer on a side of the array substrate close to the cover plate, and an orthographic projection of the optical film layer on the cover plate is within the orthographic projection of the array substrate on the cover plate.

In another aspect, the present disclosure provides a method for manufacturing a display panel, including:

providing a backlight module, wherein the backlight module is configured to provide a light source;

providing a display module and a photosensitive device on a light-emitting side of the backlight module, wherein the photosensitive device is configured to sense ambient light; and providing a cover plate on a side of the display module and the photosensitive device away from the backlight module, wherein an orthographic projection of the photosensitive device on the cover plate is within an orthographic projection of the backlight module on the cover plate.

BRIEF DESCRIPTION OF THE DRAWINGS

The accompanying drawings are used to provide a further understanding of the present disclosure and constitute a part of the specification. The accompanying drawings and the following detailed description are used together to explain the present disclosure, but are not intended to limit the present disclosure. In the drawings.

DETAILED DESCRIPTION

In order to enable those skilled in the art to understand the technical solutions of the present disclosure better, the present disclosure will be further described in detail below with reference to the accompanying drawings and

DETAILED DESCRIPTION

Generally, in a display device, in order to be able to adjust the brightness of the display screen according to the intensity of ambient light, a photosensitive device is provided in the frame area of the display device. However, due to the limitation of the structure and placement position of the photosensitive device, the bezel of the display device is relatively wide, which makes it difficult to form a full-screen structure.

Figure 1:
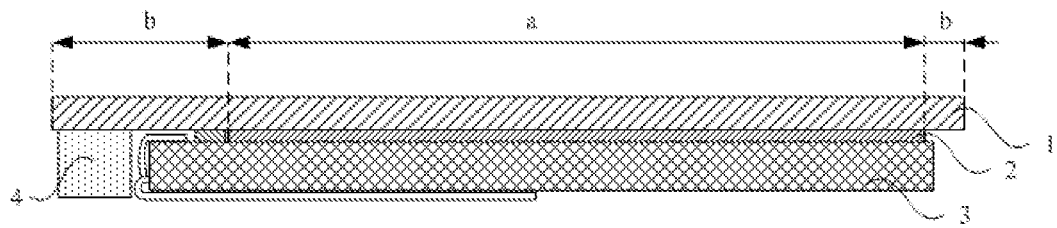
FIG. 1 is a schematic diagram of a structure of an exemplary display panel.

FIG. 1 is a schematic diagram of a structure of an exemplary display panel. As shown in FIG. 1, the photosensitive device 4 in the display panel is relatively large in structure, so the photosensitive device 4 is arranged at the periphery of the backlight module 3. In this way, the cover plate 1 is required to cover both the backlight module 3 and the photosensitive device 4, so that the size of the edge area b of the display panel is relatively large. Therefore, the width of the ink on the upper or lower side of the cover plate should be designed to be larger, which makes it difficult to form a display panel with a narrow bezel.

The present disclosure will be described below in more detail with reference to FIGS. 2 to 5. The same elements are denoted by similar reference numerals throughout the drawings. The elements in the drawings are not drawn to scale for clarity. In addition, some well-known elements may not be shown in the figures.

Many specific details of the present disclosure are described below, such as the structures, materials, dimensions, processes, and techniques of the components, in order to provide a clearer understanding of the present disclosure. However, as those skilled in the art can understand, the present disclosure may not be implemented according to these specific details.

The term "display area" as used herein refers to an area of the display panel that actually displays an image. The term "edge area" refers to an area where various circuits and wires are provided to transmit signals to the display substrate. In order to increase the transparency of the display panel, the opaque or non-transparent components of the display panel may be arranged in the edge area instead of the display area.

As shown in FIG. 2 to FIG. 5, an embodiment of the present disclosure provides a display panel having a display area a and an edge area b surrounding the display area a. The display panel includes:

a backlight module 3, configured to provide a light source;

a cover plate 1, located on a light-emitting side of the backlight module 3;

a display module 2, arranged between the cover plate 1 and the backlight module 3; and a photosensitive device 4, configured to sense ambient light, the photosensitive device 4 being arranged between the cover plate 1 and the backlight module 3, and located in the edge area b.

In the display panel, the cover plate 1 covers the entire light-emitting surface of the backlight module 3, and the display module 2 is located between the cover plate 1 and the backlight module 3. That is to say, the cover plate 1, the display module 2, and the backlight module 3 are sequentially arranged in a direction perpendicular to the cover plate 1. Uniform light generated by the backlight module 3 is directed toward the display module 2 so that the display module 2 produces a display image, and the light that finally forms the display image passes through the cover 1 and is directed toward the eyes of the user.

The photosensitive device 4 is configured to sense ambient light. In the embodiment of the present disclosure, the photosensitive device 4 adjusts the brightness of the display screen by sensing the intensity of the external ambient light, so as to improve the user experience. In the display panel according to the embodiment of the present disclosure, the photosensitive device 4 is installed between the cover plate 1 and the backlight module 3 (an orthographic projection of the photosensitive device 4 on the cover plate 1 is within an orthographic projection of the backlight module 3 on the cover plate 1). In this way, the edge area b of the display panel only needs to cover the backlight module 3.

In the display panel according to the embodiment of the present disclosure, since the photosensitive device 4 is installed between the cover plate 1 and the backlight module 3, the edge area b of the display panel only needs to cover the backlight module 3, and does not need to extend beyond the edge of the backlight module 3 too much. Compared with the exemplary display panel shown in FIG. 1, the edge area b of the display panel according to the embodiment of the present disclosure is narrower, and specifically, for example, is narrower than the edge area b of the exemplary display panel shown in FIG. 1 by at least one size of the photosensitive device 4, so that it easier to form a full screen with the display panel according to the embodiment of the present disclosure to improve the user experience.

Figure 4:
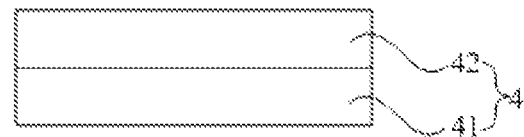
FIG. 4 is a schematic diagram of a structure of a photosensitive device according to an embodiment of the present disclosure.
Figure 5:
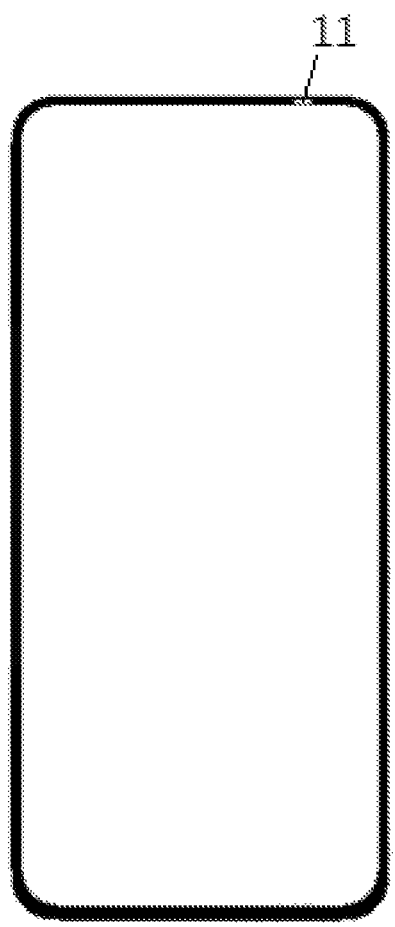
FIG. 5 is a schematic top view of a structure of a display device according to an embodiment of the present disclosure.

In the embodiments of the present disclosure, as shown in FIG. 4, the photosensitive device 4 includes a circuit board layer 41 and a transparent photosensitive layer 42 stacked on each other.

In the embodiment of the present disclosure, the photosensitive device 4 is a thin film photosensitive device 4, that is to say, the thickness of the photosensitive device 4 is relatively thin. Therefore, even if the photosensitive device 4 is arranged between the cover plate 1 and the backlight module 3, the relative positions of the backlight module 3, the display module 2, and the cover plate 1 will not be affected by the arrangement of the photosensitive device 4, thereby ensuring the display performance of the display panel.

In addition, since the thickness of the photosensitive device 4 is relatively thin, even if the photosensitive device 4 is arranged between the cover plate 1 and the backlight module 3, the overall thickness of the display panel will not be affected.

In some embodiments, a material of the transparent photosensitive layer 42 includes indium tin oxide.

It should be noted that the thin film photosensitive device 4 may also have other suitable structures or be formed of other suitable materials, which are not limited to the above-mentioned cases, and will not be described in detail here.

Figure 2:
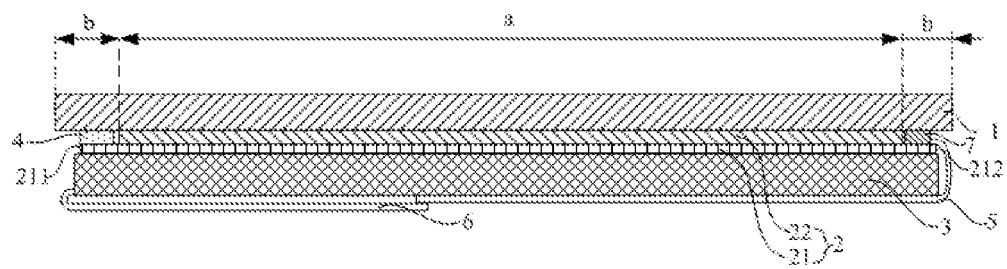
FIG. 2 is a schematic diagram of a structure of a display panel according to an embodiment of the present disclosure.

In some embodiments, as shown in FIG. 2, the display module 2 includes: an array substrate 21, at least a part of the array substrate 21 is located in the display area a, and the array substrate 21 extends from the display area a to the edge area b, so that the first edge 211 of the array substrate 21 is located in the edge area b. The photosensitive device 4 is arranged on one side of the display panel where the first edge 211 of the array substrate 21 is located, and the photosensitive device 4 is located between the array substrate 21 and the cover plate 1. In the embodiments of the present disclosure, the photosensitive device 4 is arranged on one side of the array substrate 21 close to the cover plate 1, and the orthographic projection of the array substrate 21 on the cover plate 1 at least partially overlaps with the orthographic projection of the photosensitive device 4 on the cover plate 1. In the embodiment of the present disclosure, the orthographic projection of the photosensitive device 4 on the cover plate 1 is within the orthographic projection of the array substrate 21 on the cover plate 1.

The portion of the array substrate 21 for forming a picture is located in the display area a, the array substrate 21 at least partly extends to the edge area b, and the portion of the array substrate 21 located in the edge area b may be provided with structures such as wiring. The first edge 211 of the array substrate 21 is located in the edge area b, which means the portion of the array substrate 21 close to the first edge 211 is located in the edge area b, the photosensitive device 4 is fixed on the portion of the array substrate 21, that is to say, the photosensitive device 4 is located between the array substrate 21 and the cover plate 1.

In the embodiment of the present disclosure, the orthographic projection of the light-emitting surface of the backlight module 3 on the cover plate 1 do not overlap with the orthographic projection of the photosensitive device 4 on the cover plate 1. Since the size of the photosensitive device 4 is relatively small, the light-emitting surface of the backlight module 3 can exactly correspond to the light-emitting unit of the array substrate 21, and the photosensitive device 4 can correspond to the non-light-emitting surface of the backlight module 3, so that the photosensitive device 4 arranged between the cover plate 1 and the backlight module 3 will not affect the backlight module 3 to provide the light to the display module 2. As a result, the display performance of the display panel will not be affected.

Figure 3:
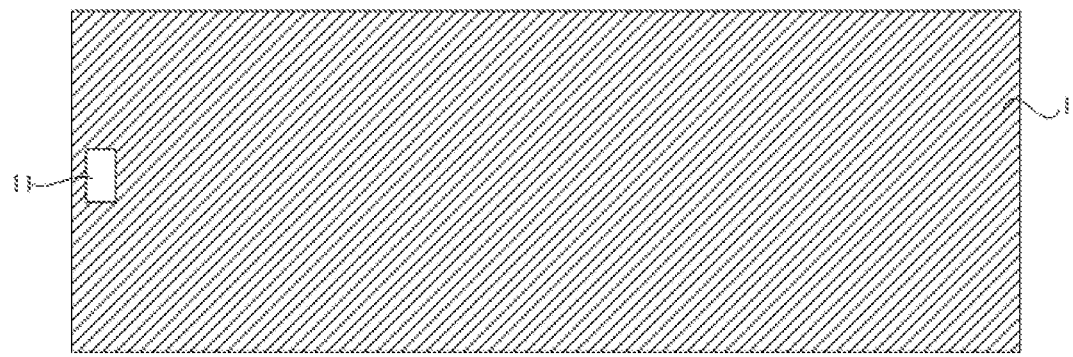
FIG. 3 is a schematic top view of a structure of a cover plate of a display panel according to an embodiment of the present disclosure.

It should be noted that, as shown in FIG. 3, the display panel has an upper border, a lower border, and two side borders. When the upper border is above the lower border, the display image seen by the user is positive. The first edge 211 of the array substrate 21 may be an edge close to the lower border, an edge close to the upper border, or an edge close to the side border. In some embodiments, the first edge 211 of the array substrate 21 is an edge close to the lower border. In other words, the photosensitive device 4 is disposed at the lower border of the display panel, so that the width of the lower border of the display panel can be reduced.

In some embodiments, the display module 2 further includes: an optical film layer 22, the optical film layer 22 is disposed on one side of the array substrate 21 close to the cover plate 1, the orthographic projection of the optical film layer 22 on the cover plate 1 is within the orthographic projection of the array substrate 21 on the cover plate 1 (specifically, the orthographic projection on the cover plate 1 of the edge of the optical film layer 22 corresponding to the first edge 211 of the array substrate 21 is in the orthographic projection of the array substrate 21 on the cover plate 1), and the orthographic projection of the photosensitive device 4 on the cover plate 1 do not overlap with the orthographic projection of the optical film layer 22 on the cover plate 1.

The corresponding edge of the optical film layer 22 does not go beyond the first edge 211 of the array substrate 21. In the embodiment of the present disclosure, the first edge 211 of the array substrate 21 protrudes relative to the optical film layer 22; the photosensitive device 4 is located on one side of the display panel where the first edge 211 of the array substrate 21 is located and is directly arranged on the portion of the array substrate 21 protruding relative to the optical film layer 22. In this case, the optical film layer 22 is not provided at a position of the array substrate 21 close to the first edge 211, and the photosensitive device 4 is provided at the position.

Since the first edge 211 of the array substrate 21 extends beyond the optical film layer 22, the portion of the array substrate 21 extending beyond the optical film layer 22 forms a step with the edge of the optical film layer 22. The thin film photosensitive device 4 is arranged at the step and can provide support between the array substrate 21 and the cover plate 1, so as to stabilize the structure of the display panel.

It should be noted that the optical film layer 22 may be a structure such as a color filter layer (CF), a polarizer or the like of the display module 2.

In some embodiments, the display panel further includes: a first circuit board 5 (COF), the first circuit board 5 is bent from one side of the backlight module 3 close to the cover plate 1 to one side of the backlight module 3 away from the cover plate 1, so that the first end of the first circuit board 5 is coupled to the second edge 212 of the array substrate 21, and the second end of the first circuit board 5 is coupled to the surface of the backlight module 3 away from the cover plate 1. The second edge 212 of the array substrate 21 is opposite to the first edge 211 of the array substrate 21.

It should be noted that the first circuit board 5 is a flexible circuit board coupled to the display driving structure of the array substrate 21. Since there are many structures (such as multiple transistors or multiple wires) on the flexible circuit board, it is generally necessary to bend the first circuit board 5 to the back of the display panel in order to narrow the bezel of the display panel.

Since the first circuit board 5 bent to the back of the display panel is coupled to the backlight module 3, and the structure of the first circuit board 5 is relatively large and has certain rigidity, the bent first circuit board 5 will apply a force toward the backlight module 3 to the array substrate 21. If the first end of the first circuit board 5 is coupled to the first edge 211 of the array substrate 21, the array substrate 21 may be deformed to cause light leakage, thereby affecting the photosensitive performance of the photosensitive device 4 on the array substrate 21.

In the display panel according to the embodiment of the present disclosure, the first end of the first circuit board 5 is coupled to the second edge 212 of the array substrate 21, in this case, the first circuit board 5 is bent at the second edge 212 of the array substrate 21 so as to avoid the influence on the photosensitive device 4 of the light leakage phenomenon caused by the deformation of the array substrate 21.

It should be noted that the backlight module 3 includes an outer frame for holding the internal structure of the backlight module 3, and the second end of the first circuit board 5 can also be fixedly coupled to the outer frame of the backlight module 3.

In some embodiments, the display panel according to the embodiment of the present disclosure further includes: a second circuit board 6 (LED_FPC), one end of the second circuit board 6 is coupled to the light source of the backlight module 3, and the other end of the second circuit board 6 is coupled to the second end of the first circuit board 5.

The second circuit board 6 is a circuit board coupled to the light source (such as an LED lamp) in the backlight module 3, and is configured to provide electrical signals to the light source so that the light source can emit light. Since the structure of the second circuit board 6 is relatively small, the force of the bent second circuit board 6 towards the array substrate 21 is relatively small, the array substrate 21 will not be deformed, and therefore the photosensitive performance of the photosensitive device 4 on the array substrate 21 will not be affected.

It should be noted that when the first circuit board 5 is bent near the lower bezel of the display panel, and the second circuit board 6 is bent near the upper bezel of the display panel.

In some embodiments, the second edge 212 of the array substrate 21 protrudes relative to the optical film layer 22, and the display panel further includes a supporting structure 7, the supporting structure 7 is located on one side of the display panel where the second edge 212 of the array substrate 21 is located and is directly arranged on the portion of the array substrate 21 protruding relative to the optical film layer 22. In this case, the corresponding edge of the optical film layer 22 does not extend beyond the second edge 212 of the array substrate 21, and the optical film layer 22 is not provided at a position of the array substrate 21 close to the second edge 212. The supporting structure 7 can be provided at the position to support the array substrate 21 and the cover plate 1 and ensure the service life of the array substrate 21. The supporting structure 7 may be silicone rubber or other suitable structures.

It should be noted that the display module 2 also includes a variety of structures such as pads, light-shielding adhesive, etc., which will not be described in detail here. The backlight module 3 also includes structures such as a light guide plate, a light source (LED lamp), etc. The backlight module may be of side type or bottom type. In some embodiments, the backlight module 3 is of side type, that is to say, the light source is located on one side of the light guide plate. Further, the light source is arranged at a position close to the photosensitive device 4.

In some embodiments, as shown in FIG. 3, a portion of the cover plate 1 located in the edge area b includes: a light-transmitting area 11 and a non-light-transmitting area (ink area), and the light-transmitting area 11 corresponds to the photosensitive device 4 (for example, the orthographic projection of the photosensitive device 4 on the cover plate 1 is in the light-transmitting area 11), so that ambient light passes through the light-transmitting area 11 to arrive at the photosensitive device 4.

In order to enable the photosensitive device 4 to sense the intensity of the ambient light accurately, a light-transmitting area 11 needs to be provided at a position on the cover plate 1 corresponding to the photosensitive device 4. In this way, ambient light can pass through the light-transmitting area 11 to arrive at the photosensitive device 4. In addition, the intensity and other properties of the ambient light passing through the light-transmitting area 11 will not be changed, thereby the photosensitive performance of the photosensitive device 4 is ensured.

In some embodiments, the light-transmitting area 11 of the cover plate 1 is a transparent area, or the light-transmitting area 11 of the cover plate 1 is a through hole in the cover plate 1.

The light-transmitting area 11 may be a transparent area, and ambient light can pass through the transparent area to arrive at the photosensitive device 4, and the transparent area does not change the intensity of the ambient light.

The light-transmitting area 11 may also be a through hole in the cover plate 1, and ambient light can pass through the through hole to arrive at the photosensitive device 4, and the through hole does not change the intensity of the ambient light.

It should be noted that the structure of the light-transmitting area 11 may also be other suitable structures, which are not limited to the above two cases, and will not be listed here.

As shown in FIGS. 2 to 5, an embodiment of the present disclosure further provides a display device including a display panel. The display panel includes:

a backlight module, configured to provide a light source;

a cover plate, located on a light-emitting side of the backlight module;

a display module, arranged between the cover plate and the backlight module; and a photosensitive device, configured to sense ambient light, arranged between the cover plate and the backlight module, and located at the edge of the cover plate.

In the embodiments of the present disclosure, the display panel has a display area and an edge area surrounding the display area, and the photosensitive device is located in the edge area.

In the embodiments of the present disclosure, the display module includes: an array substrate, the array substrate extends from the display area to the edge area, the photosensitive device is on one side of the array substrate close to the cover plate, and the orthographic projection of the array substrate on the cover plate at least partially overlaps with the orthographic projection of the photosensitive device on the cover plate. In some embodiments, the orthographic projection of the photosensitive device on the cover plate is within the orthographic projection of the array substrate on the cover plate.

In the embodiments of the present disclosure, the display module further includes: an optical film layer, the optical film layer is disposed on one side of the array substrate close to the cover plate, and the orthographic projection of the optical film layer on the cover plate is within the orthographic projection of the array substrate on the cover plate.

In the embodiments of the present disclosure, the first edge of the array substrate protrudes relative to the optical film layer; the photosensitive device is located on the side of the first edge of the array substrate, and is directly arranged on the portion of the array substrate protruding relative to the optical film layer.

The display panel includes a photosensitive device 4, and the photosensitive device 4 is configured to sense ambient light. The photosensitive device 4 adjusts the brightness of the display screen by sensing the intensity of the external ambient light, so as to improve the user experience. In the display panel according to the embodiment of the present disclosure, the photosensitive device 4 is installed between the cover plate 1 and the backlight module 3, so that the edge area b of the display panel only needs to cover the backlight module 3.

In the display device according to the embodiment of the present disclosure, since the photosensitive device 4 is installed between the cover plate 1 and the backlight module 3, the edge area b of the display panel only needs to cover the backlight module 3, and does not need to extend beyond the edge of the backlight module 3 too much. Compared with the exemplary display panel shown in FIG. 1, the edge area b of the display panel according to the embodiment of the present disclosure is narrower, and specifically, for example, is narrower than the edge area b of the exemplary display panel shown in FIG. 1 by at least one size of the photosensitive device 4, so that it easier to form a full screen with the display panel according to the embodiment of the present disclosure to improve the user experience.

The display device according to the present disclosure may be any product or component with a display function, such as a liquid crystal display panel, an organic light-emitting diode (OLED) display panel, an electronic paper, a mobile phone, a tablet, a television, a monitor, a laptop, a digital photo frame, a navigator, and the like. For the realization principle and technical effects of the display device, reference may be made to the above-mentioned discussion on the realization principle and technical effects of the display panel, which will not be repeated here.

In another aspect, the present disclosure provides a method for manufacturing a display panel, including:

providing a backlight module, the backlight module being configured to provide a light source;

providing a display module and a photosensitive device on a light-emitting side of the backlight module, the photosensitive device being configured to sense ambient light; and providing a cover plate on a side of the display module and the photosensitive device away from the backlight module, an orthographic projection of the photosensitive device on the cover plate being within an orthographic projection of the backlight module on the cover plate.

It should be noted that, relational terms herein such as first, second and the like are only used to distinguish one entity or operation from another entity or operation, and not necessarily require or imply any such actual relationship or order between these entities or operations. Moreover, the terms "include", "comprise" or any other variations thereof are intended to cover non-exclusive inclusion, so that a process, method, article or device including a series of elements not only includes those elements, but also includes other elements that are not explicitly listed, or elements inherent to the process, method, article, or device. If there are no more restrictions, the element defined by the sentence "including a . . . " does not exclude the existence of other identical elements in the process, method, article, or device that includes the element.

According to the embodiments of the present disclosure as described above, these embodiments do not describe all the details in detail, nor do they limit the disclosure to only the specific embodiments described. Obviously, many modifications and changes can be made based on the above description. This specification selects and specifically describes these embodiments in order to explain the principles and practical applications of the present disclosure better, so that those skilled in the art can make good use of the present disclosure and modifications based on the present disclosure. The present disclosure is limited only by the claims and their full scope and equivalents.

What is claimed is:

1. A display panel comprising:
a backlight module configured to provide a light source;
a cover plate on a light-emitting side of the backlight module;
a display module between the cover plate and the backlight module, wherein the display module comprises an array substrate and an optical film layer on a side of the array substrate facing the cover plate, and a first edge of the array substrate protrudes relative to the optical film layer;
a photosensitive device configured to sense ambient light, wherein the photosensitive device is between the cover plate and the backlight module and at an edge of the cover plate, and the photosensitive device is at a side of the display panel where the first edge of the array substrate is located, and is directly on a portion of the array substrate protruding relative to the optical film layer; and
a first circuit board bent from a side of the backlight module facing the cover plate to a side of the backlight module facing away from the cover plate, such that a first end of the first circuit board is coupled to a second edge of the array substrate, and a second end of the first circuit board is coupled to a surface of the backlight module facing away from the cover plate, and the second edge of the array substrate is opposite to the first edge of the array substrate and is not provided with the photosensitive device,
wherein the second edge of the array substrate protrudes relative to the optical film layer, and the display panel further comprises a supporting structure, which is on a side of the display panel where the second edge of the array substrate is located, and is directly on a portion of the array substrate protruding relative to the optical film layer.

2. The display panel of claim 1, wherein the display panel has a display area and an edge area surrounding the display area, and the photosensitive device is in the edge area.

3. The display panel of claim 2, wherein the array substrate extends from the display area to the edge area, the photosensitive device is on a side of the array substrate facing the cover plate, and an orthographic projection of the array substrate on the cover plate at least partially overlaps with an orthographic projection of the photosensitive device on the cover plate.

4. The display panel of claim 3, wherein the orthographic projection of the photosensitive device on the cover plate is within the orthographic projection of the array substrate on the cover plate.

5. The display panel of claim 3, wherein an orthographic projection of the optical film layer on the cover plate is within the orthographic projection of the array substrate on the cover plate.

6. The display panel of claim 5, wherein the orthographic projection of the photosensitive device on the cover plate does not overlap with the orthographic projection of the optical film layer on the cover plate.

7. The display panel of claim 2, wherein a portion of the cover plate within the edge area comprises: a light-transmitting area and a non-light-transmitting area, and an orthographic projection of the photosensitive device on the cover plate is within the light-transmitting area.

8. The display panel of claim 7, wherein the light-transmitting area is a transparent area.

9. The display panel of claim 7, wherein the light-transmitting area of the cover plate is a through hole in the cover plate.

10. The display panel of claim 2, wherein the photosensitive device comprises a circuit board layer and a transparent photosensitive layer stacked on each other.

11. The display panel of claim 10, wherein a material of the transparent photosensitive layer comprises indium tin oxide.

12. The display panel of claim 1, further comprising: a second circuit board, wherein one end of the second circuit board is coupled to the light source of the backlight module, and the other end of the second circuit board is coupled to the second end of the first circuit board.

13. A display device comprising a display panel, wherein the display panel is the display panel of claim 1.

14. The display device of claim 13, wherein the display panel has a display area and an edge area surrounding the display area, and the photosensitive device is in the edge area.

15. The display device of claim 14, wherein the array substrate extends from the display area to the edge area, the photosensitive device is on a side of the array substrate facing the cover plate, and an orthographic projection of the array substrate on the cover plate at least partially overlaps with an orthographic projection of the photosensitive device on the cover plate.

16. The display device of claim 15, wherein an orthographic projection of the optical film layer on the cover plate is within the orthographic projection of the array substrate on the cover plate.

17. A method for manufacturing a display panel, comprising:
providing a backlight module, wherein the backlight module is configured to provide a light source;
providing a display module and a photosensitive device on a light-emitting side of the backlight module, wherein the photosensitive device is configured to sense ambient light, wherein the display module comprises an array substrate and an optical film layer on a side of the array substrate facing the cover plate, a first edge of the array substrate protrudes relative to the optical film layer, and the photosensitive device is at a side of the display panel where the first edge of the array substrate is located, and is directly on a portion of the array substrate protruding relative to the optical film layer;
providing a cover plate on a side of the display module and the photosensitive device facing away from the backlight module, wherein an orthographic projection of the photosensitive device on the cover plate is within an orthographic projection of the backlight module on the cover plate; and
providing a first circuit board bent from a side of the backlight module facing the cover plate to a side of the backlight module facing away from the cover plate, such that a first end of the first circuit board is coupled to a second edge of the array substrate, and a second end of the first circuit board is coupled to a surface of the backlight module facing away from the cover plate, and the second edge of the array substrate is opposite to the first edge of the array substrate and is not provided with the photosensitive device,
wherein the second edge of the array substrate protrudes relative to the optical film layer, and the method further comprises providing a supporting structure on a side of the display panel where the second edge of the array substrate is located, and directly on a portion of the array substrate protruding relative to the optical film layer.

* * * * *